Figure 3:
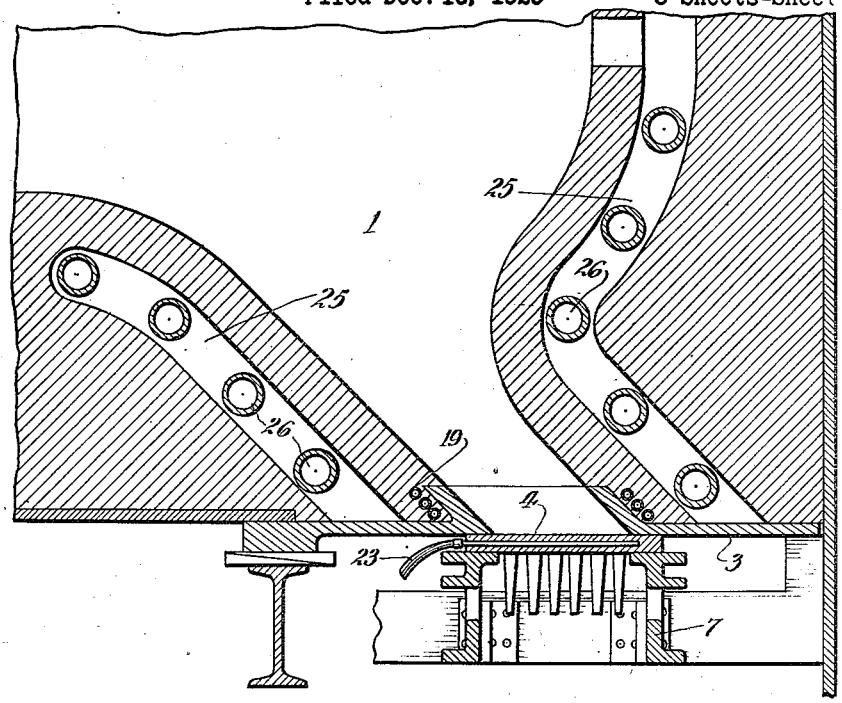

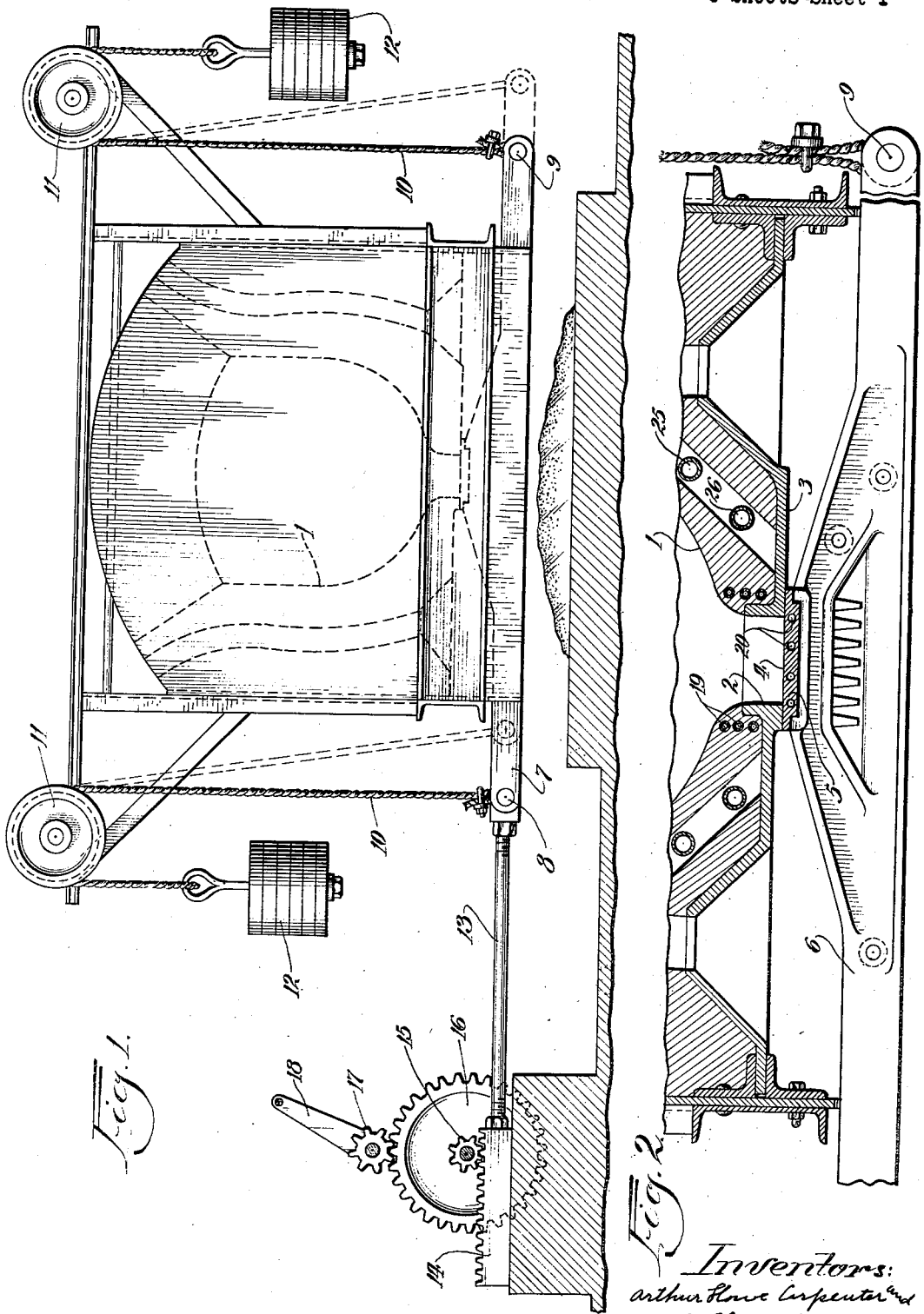

May 31, 1927.

A. H. CARPENTER ET AL 1,630,829

POURING DEVICE FOR GLASS FURNACES

Filed Dec. 10, 1925   3 Sheets-Sheet 2

Inventors:
Arthur Howe Carpenter and
Philip C. Huntley,
By Wm. F. Freudenreich, Atty.

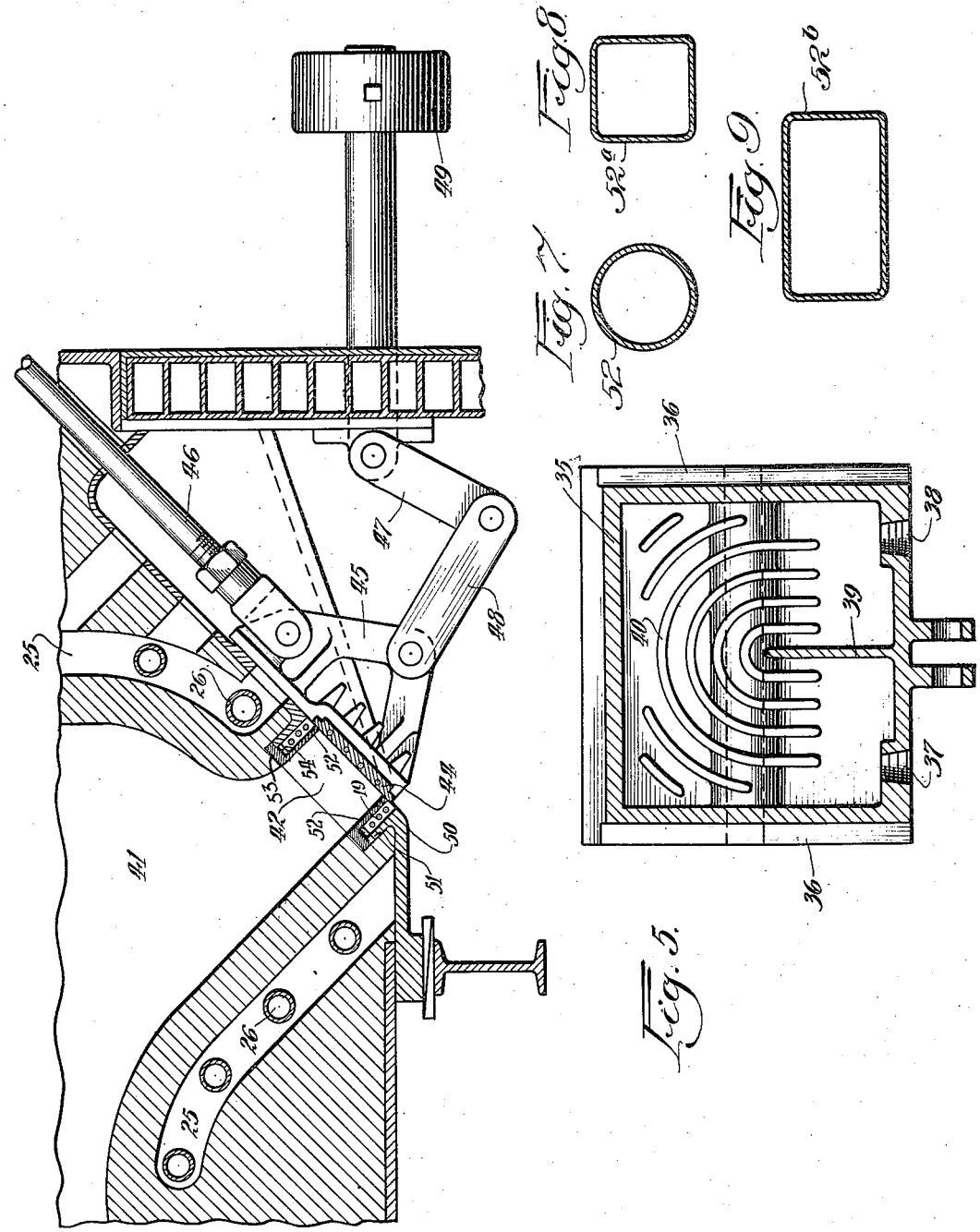

Patented May 31, 1927.

1,630,829

UNITED STATES PATENT OFFICE.

ARTHUR HOWE CARPENTER, OF LA GRANGE, AND PHILIP C. HUNTLEY, OF RIVERSIDE, ILLINOIS, ASSIGNORS TO THE VITROLITE COMPANY, OF PARKERSBURG, WEST VIRGINIA, A CORPORATION OF WEST VIRGINIA.

POURING DEVICE FOR GLASS FURNACES.

Application filed December 10, 1925. Serial No. 74,631.

The object of the present invention is to permit the delivery of molten glass directly to a casting table or the like directly from the furnace, without the intervention of a ladle or similar means.

In carrying out our invention we provide the furnace with a pouring spout of comparatively large cross section, the flow of molten glass from the spout being controlled by a valve or gate. If a simple spout and gate were employed, it would be impossible to pour successfully, as the glass would clog the gate. Viewed in one of its aspects, our invention may be said to have for its object to produce a simple and novel valved or gated pouring spout for a glass furnace which will be self-cleaning and insure a normal flow of normal material whenever the valve is opened.

We have found that by utilizing a slide valve to extend across and cover the outlet end of the spout, and cooling the valve by causing water to flow through the same, or otherwise, the glass directly above the same will form a more or less solidified layer lying just within the mouth of the spout, so that when the valve is opened, this layer will scrape off and leave the surface of the valve clean. Therefore the valve may be opened and shut to meet the demand, without impairment in efficiency of operation and control. Since the cooling action of the valve tends to continue upwardly through the molten glass in the spout or discharge passage, means must be provided for preventing the cooling of the glass except that directly in contact with the valve. We therefore provide heating means for the lower end of the spout, which means may conveniently take the form of electrical heating coils or resistance elements embedded within the walls of the spout and surrounding the lower end of the same.

We have found that when the downflow is symmetrical with respect to a central vertical axis, namely when the longitudinal central axis of the spout is vertical, there is a tendency for the molten glass to take the form of a tube as it passes through the spout, thus permitting air to be collected and causing air bubbles to be formed in the mass deposited on the table. In the preferred form of our invention, therefore, the spout is arranged so that the center of the outlet is removed far to one side of the center of the upper portion. Our invention in one of its aspects, may therefore be regarded as having for its object to produce a simple and novel pouring spout, the passage through which is approximately vertical, but so arranged that it is impossible for a hollow to form at the core of the mass of molten glass in the spout, as the glass flows down.

Figure 4:
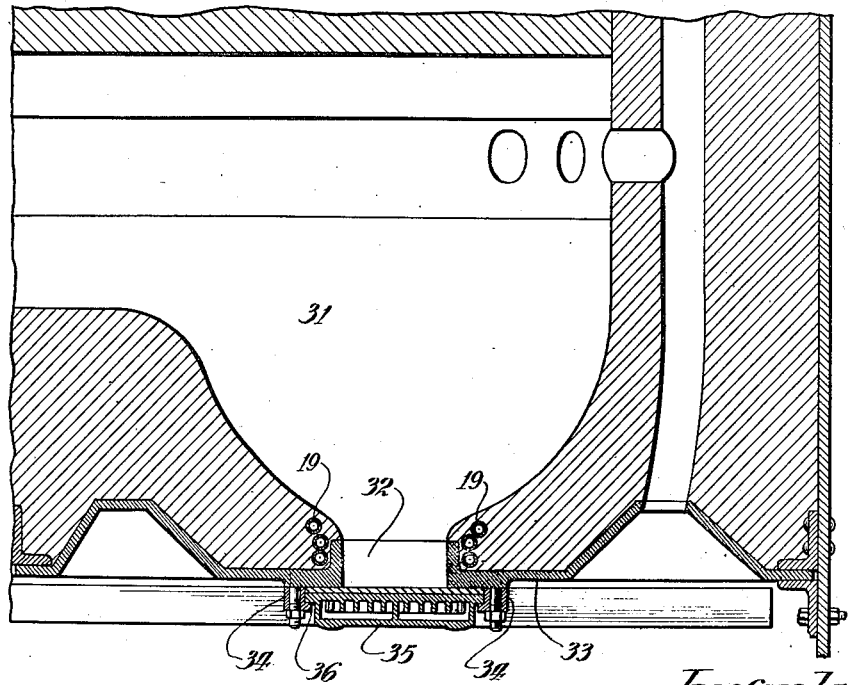

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a front view of so much of a glass furnace and a casting table as is necessary to illustrate the present invention, showing one form of pouring spout; Fig. 2 is a vertical transverse section, on a larger scale than Fig. 1, showing the spout and the valve; Fig. 3 is a vertical section, taken at right angles to the plane of Fig. 2; Fig. 4 is a view similar to Fig. 3, showing a different form of valve; Fig. 5 is a horizontal section through the valve shown in Fig. 4; and Fig. 6 is a view similar to Figs. 2, 3 and 4, showing still another form of spout and valve. Figs. 7, 8 and 9 show various forms of sleeves which may be used in corresponding forms of flow spouts.

Referring to Figs. 1–3 of the drawings, 1 represents a chamber at one side of the main furnace chamber (not shown), from which main chamber the molten glass flows into the chamber 1. In the bottom of the chamber 1 is a somewhat elongated vertical discharge passage constituting the spout. The lower portion of the spout is preferably formed in a casting having a flat portion 3 forming the bottom of the lower chamber wall. A valve 4 in the form of a thick plate, lying flat against the under face of the casting, serves to control the flow of glass, or completely to check such flow, from the spout. This valve rests detachably in seats 5 in the upper edges of two transverse horizontal bars 6 and 7. These bars may be connected together to form a frame, by means of rods 8 and 9 extending beween them at their ends. This frame is suspended from two cables 10, 10 at opposite ends thereof, passing upwardly over pulleys 11, 11 and provided at their free ends with counterweights 12. These counterweights yieldingly hold the valve against its seat. In order to operate the valve, the frame is moved in the direction of its length in any suitable manner. In the arrangement shown, the frame has fastened thereto a rigid rod 13 provided at its outer end with a rack 14 that is engaged by a driving pinion 15 rotatable in any suitable manner. If the valve is to be operated by hand, the pinion may be fixed to or mounted to rotate with a gear wheel 16 which is in turn rotated by a pinion 17 operated by a suitable crank 18.

Within the walls of the chamber, surrounding the spout, are heating elements, such as electrical heating coils 19. The valve is provided with passages 20 through which a cooling medium may be passed.

As shown in Fig. 3, the spout is arranged at an angle to the vertical when viewed from the side; the inclination being such that a vertical line drawn tangent to that side of the spout that overlies the mouth of the latter, cuts the plane of the mouth near the lower end of the opposite wall. If the central axis of the spout were vertical, the descending column of molten glass that flows down when the valve is opened might be hollow at the core; but, by inclining the spout, the descending glass at the right hand side of the upper end of the spout, as viewed in Fig. 3, is moving in a direction to fill any hollow which may have started, so that the column will always be solid in the plane of the outlet end of the spout.

If desired, there may be an annular chamber 25 surrounding the chamber 1; and this additional chamber may contain heating means for heating the entire contents of the chamber as, for example, pipes 26.

In the arrangement shown in Figs. 4 and 5, the chamber 31 is similar to the corresponding parts in Figs. 1–3, but the spout and the valve are different. The spout, indicated at 32, is vertical. The bottom casting 33 has two parallel guide ledges 34, 34 fastened thereto at opposite sides of the lower end of the spout. The valve 35 has flanges 36 interlocked with these guide ledges, whereby the valve is held against the bottom casting and is permitted to slide along the same. The construction of the valve is best shown in Fig. 5. It will be seen that the interior of the valve is hollow. In what may be designated the front end, is an inlet opening 37 and an outlet opening 38. Between these openings is a partition 39 extending from the front wall about half-way toward the rear. The rear half of the chamber in the valve contains a plurality of concentric arc-shaped ribs 40 that divide the rear portion of the chamber into a series of curved channels one end of each of which is on one side of the partition 39 and the other end of each of which is on the opposite side of that partition. Therefore a stream of water entering the inlet 37 is divided into a plurality of streams before it reaches the outlet, so that the entire working face of the valve is cooled.

In Fig. 6 the chamber 41 is similar to the chambers 1 and 31, and the spout 42 is similar to the spout 2. However, the lower end of the spout is cut off so that the plane of the outlet end is approximately at right angles to the central longitudinal axis of the spout. The valve 44 is therefore arranged at an angle to the vertical. It is shown as carried by a bracket 45 adapted to be moved by a rod 46 so as to slide the valve along the bottom casting 47. The valve is held against its seat by a bell crank lever 47, one arm of which is connected to the bracket 45 by a link 48, while the other arm carries a heavy counterweight 49. This counterweight mechanism presses the valve against its seat at all times, but permits it to slide back and forth to open and close the outlet end of the spout.

In each of the forms of our invention, it will be seen that there is a short, approximately vertical discharge passage of large cross-sectional area so that the molten glass may be discharged freely. Furthermore, each valve slides on the smooth face of the casting forming the bottom of the lower wall of the furnace chamber, so that the partially congealed layer or film of glass that rests on the valve when the latter is closed, will be cleanly scraped from the working face of the valve and will be remelted as it is carried down with the molten glass flowing down to the casting table. In each form, also, the lower end of the column of molten glass in the spout or outlet passage is supplied with external heat, so that all of the glass in the spout, except the thin layer in contact with the valve, remains in a fluid state; and consequently there is sufficient heat energy contained in the column of molten glass in the spout to insure the reliquifying of the small quantity of partially cooled glass that is scraped from the face of the valve.

The metal portions of the spouts should be made of a special steel whereas cast iron may be used for the bottom casting along which the valve slides. The metal portion of the spout is therefore preferably made separate from the main casting. An arrangement of this kind is shown in Fig. 6 wherein the main bottom casting 50 has an opening through the same larger than the cross-sectional area of the spout, this opening being surrounded by a wall 51. A sleeve 52 lies in the space surrounded by said wall, forming therewith an annular chamber in which the heating element 19 is housed. The sleeve 52 may be made of a special steel or other material adapted to resist the action of the molten glass. The sleeve may have a flange 53 resting on the upper edge of the wall 51 and lugs 54 to space it apart from the inner sides of the wall. The heating element may be made up as a ring of fire clay or the like, containing resistance coils, the ring being of a size to adapt it to be slipped up from the bottom into the annular space surrounding the sleeve.

The spout may be of any desired cross-section, different shapes being desirable under different conditions. Thus the shape may be round, as indicated in Fig. 7; or square with rounded corners as 52ª in Fig. 8, or rectangular, with rounded corners, as 52ᵇ in Fig. 9.

While we have illustrated and described with particularity only a few simple forms of our invention, we do not desire to be limited to the exact structural details thus illustrated and described; but intend to cover all forms and arrangements which come within the definitions of our invention constituting the appended claims.

We claim:

1. A glass furnace chamber having a short downwardly extending spout of comparatively large cross-sectional area, one side of the spout being inclined and the opposite side, at the upper end of the spout, extending inwardly to a vertical plane not far distant from the lower end of the first-mentioned side.

2. A glass furnace chamber having a short downwardly-extending spout of comparatively large cross-sectional area, one side of the spout being inclined and the opposite side overhanging the outlet end of the spout.

3. A glass furnace chamber having a spout for discharging molten glass, a slide valve movable across the outlet end of the spout between a position in which it closes said end of the spout and a second position in which it lies at one side of the spout, and a counterweight tending constantly to move said slide valve into the first-named position.

In testimony whereof, we sign this specification.

ARTHUR HOWE CARPENTER.
PHILIP C. HUNTLEY.